United States Patent [19]

Greten

[11] Patent Number: 4,525,315

[45] Date of Patent: Jun. 25, 1985

[54] METHOD OF CORRECTING IRREGULARITIES IN THE BUILT-UP OF A MAT DURING THE MANUFACTURE OF PARTICLEBOARD

[75] Inventor: Ernst Greten, Alfeld, Fed. Rep. of Germany

[73] Assignee: GreCon Greten GmbH & Co. KG, Alfeld, Fed. Rep. of Germany

[21] Appl. No.: 447,970

[22] Filed: Dec. 8, 1982

[30] Foreign Application Priority Data

Dec. 9, 1981 [DE] Fed. Rep. of Germany ....... 3148800

[51] Int. Cl.³ ........................... B29J 5/00; G01N 9/00; G01N 21/86
[52] U.S. Cl. .................... 264/40.4; 264/40.2; 264/109; 73/159; 73/32 R; 73/433; 356/431; 156/360
[58] Field of Search ............... 73/159, 32 R, 433, 435, 73/432 L; 264/40.2, 40.4, 40.1, 109; 156/360; 356/431

[56] References Cited

U.S. PATENT DOCUMENTS

| | | | |
|---|---|---|---|
| 2,919,624 | 1/1960 | Lindemann et al. | 73/159 UX |
| 3,190,261 | 6/1965 | Ziffer | 73/159 X |
| 3,308,658 | 3/1967 | Bryan | 73/159 |
| 3,474,160 | 10/1969 | Doering | 264/40.1 |
| 3,474,668 | 10/1969 | Mangan | 73/159 |
| 3,671,726 | 6/1972 | Kerr | |
| 3,843,434 | 10/1974 | Heiks et al. | 156/360 X |
| 4,037,462 | 7/1977 | Necker et al. | 73/32 R |
| 4,247,497 | 1/1981 | Wolf | 264/40.4 |
| 4,322,971 | 4/1982 | Strobel | 73/159 |

FOREIGN PATENT DOCUMENTS

| | | |
|---|---|---|
| 1051016 | 2/1959 | Fed. Rep. of Germany . |
| 1807600 | 6/1969 | Fed. Rep. of Germany . |
| 7100795 | 5/1971 | Fed. Rep. of Germany . |
| 2124444 | 11/1972 | Fed. Rep. of Germany . |
| 52-583 | 5/1978 | Japan ................. 264/40.4 |

Primary Examiner—Stewart J. Levy
Assistant Examiner—Tom Noland

[57] ABSTRACT

A method of correcting irregularities in the build-up of a mat during the manufacture of particleboard in which a plurality of individual measurements are taken substantially transverse to the mat as it moves through a measuring station. The measurements take the form of contactless measurements of the distance between a predeterminable measuring plane and the surface profile of the mat. The measured values that are obtained are further processed as representative values of weight per unit area for the positions at which the measurements are taken. The apparatus for effecting the contactless measurements is conveniently either optical apparatus or ultrasonic apparatus.

13 Claims, 2 Drawing Figures

METHOD OF CORRECTING IRREGULARITIES IN THE BUILT-UP OF A MAT DURING THE MANUFACTURE OF PARTICLEBOARD

The invention relates to a method of determining and evaluating fluctuations of the weight per unit area of mats containing lignocellulose and/or cellulose containing particles, fibers or the like and also at least one binder, wherein a plurality of individual measurements are carried out, at least substantially in the transverse direction of a mat passing through a measuring station, and wherein indication and/or control values are formed from the measured values for the purpose of correcting irregularities occurring in the mat build-up.

In manufacturing chip board, fiberboard, wood-cementboards and similar boards, the mixture of lignocellulose and/or cellulose containing particles, fibers or the like and the binder in the form of glue, cement, gipsum or the like and also combinations thereof are scattered with the aid of a forming station to form a mat and are subsequently pressed under the application of heat and pressure to form boards.

Severe requirements must be placed on the uniformity of the scattering because the strength characteristics of the finished boards are directly dependent on the uniformity of the scattering, i.e. on the uniformity of the weight per unit area.

Disturbing fluctuations in the weight per unit area within a board arise primarily through material fluctuations characteristic of the working material wood, through faults in the drying, through differing degrees of comminution-which principally arise due to the reducing sharpness of the knives used to form the chips, through glueing faults and also faults in the forming stations. Fluctuations in the longitudinal direction of a board mainly occur over longer periods of time and depend principally on the material and also the working steps prior to the forming station, whereas variations in the transverse direction of the mat, or of the board, are mainly of shorter duration and depend principally on the conditions in the respective forming station.

In addition comes the fact that to satisfy the prevailing norms certain strength values must be guaranteed for such boards. As these strength characteristics, in particular the bending strength and transverse tensile strength, are in practice directly correlated with the density of a board of this kind the requirement exists that at least the minimum density corresponding to the required strength be maintained at all times. This signifies that this minimum density must also be present at those parts of a board where the fluctuations which occur result in the lowest weight per unit area. As moreover, in practice, the effects of the different errors can add up, it is necessary when manufacturing the boards to calculate in known manner with safety reserves which can amount to up to 10%, i.e. this much more material would have to be used than it is actually required. Experience shows that the weight per unit area tends to fluctuate by from ±5 to ±8% about this desired value which already takes account of the safety reserve. Many attempts have already been made to detect and reduce these disturbing fluctuations in weight per unit area.

It is for example known to daily cut strips from several boards during the continuous production of boards and then to measure the strips in the laboratory to assess the distribution of weight per unit area. This system of taking a sample is however expensive and involved, is subject to uncertainty so faar as the read across of the measurement results to the total production is concerned, and above all is not sufficiently fast to allow immediate action to be taken during manufacture on the occurrence of disturbing or impermissible fluctuations in the weight per unit area.

A device for measuring the weight per unit area using a gamma ray source is known from DE-Gbm No. 71 00 795. This device operates in accordance with the through radiation principle, or the back radiation principle, and has for this purpose a radiation source and a target or a receiver which measures the intensity of the incident radiation. The intensity of the received radiation, which is evaluated as the measurement signal, is dependent on the quantity or thickness of the material lying in the beam path. All measuring processes involving radioactive substances have however a series of disadvantages. First of all expensive screening measures have to be taken because of the existing safety regulations. Secondly, the usable measuring cone has, as a rule, a diameter of from 15 to 30 cm, so that in carrying out measurements at the edge of the mat under investigation, which is particularly interesting for technical reasons, pronounced falsification of the measurement result can occur. Thirdly, the achievable measuring speed is restricted in view of the natural statistics of the radio isotope source. Moreover, when using the through radiation method the mat carriers which consist of sheet metal or bands must also be irradiated and tolerances in these mat carriers enter into the measurement. When using a back radiation measuring method the sacrifices which have to be made with regard to the achievable accuracy are such that this method can in many cases not be used.

One method of achieving mats with weights that are as uniform as possible, i.e. as close to a predetermined weight as possible, is known from U.S. Pat. No. 4,038,531. In this arrangement the weight of each individual mat carrier, which can differ from mat carrier to mat carrier and which moreover varies as a result of wear, is excluded from the measurements by first determining the weight of an empty mat carrier and then subtracting this from the total weight of a mat carrier carrying a mat. If the calculated weight of the mat then deviates from the desired value either the transport speed of the mat carriers or the quantity of mat material which is dispensed is changed, so that the desired weigh per mat section is once again achieved. This method is however relatively expensive and involded, is inaccurate and does not make it possible to influence the distribution of the weight per unit area in the transverse and/or longitudinal direction of the mat in the sense of rendering this distribution uniform.

The principal object underlying the invention is to develop a method of the kind initially set forth so that an improvement in the uniformity of the weight per unit area is achieved which leads to a significant saving of raw material costs, so that a continuous quality control of the mat which is formed is simultaneously ensured by a high operating speed, and so that any form of environmental danger through radioactive substances is avoided.

SUMMARY OF THE INVENTION

This object is satisfied in accordance with the invention in that the individual measurements are made in the form of contactless meausrements of the distance between a predeterminable measurement plane and the surface profile of the mat, and in that the measured values are further processed as values of weight per unit area representative of the respective position of measurement.

The invention thus provides a practically complete correlation between the scattered height of the mat and the weight per unit area by sensible exploitation of the recognition that it is possible to distinguish between variations in the weight per unit area in the transverse direction and in the longitudinal direction of the mat, with deviations in the longitudinal direction being principally material dependent and occurring over comparatively long periods of time, whereas deviations in the weight per unit area in the transverse direction are almost exclusively machine-dependent. As a result the invention ensures in a really simple and unproblematic manner that measured values of high accuracy are practically continuously achieved and then, in each case, evaluated in suitable manner or used to introduce such correction meausres as may eventually be necessary.

A light beam is preferably used for the contactless distance measurement and is focussed relative to the mat surface in such a way that the size of the scanning light bead generated on the surface of the mat lies at least within the range of the smallest occurring surface irregularities of the mat, and thereby enables a very accurate determination of the surface irregularities, or of the values of weight per unit area. The distance between the measuring plane and the scanning light bead is preferably determined by means of an optical system or by a transit time measurement. The individual measurements in the transverse direction of the mat are preferably made one after the other and with a comparatively high cycle frequency, which may for example be around 16 kHz. If, by way of example, one operates with a traversing measuring unit it is possible in this way, even with very high speeds of advance of the mat, to ensure a rapid movement in the transverse direction with scanning light points which lie practically directly adjacent one another.

The mean value is preferaly formed from the individual values found during each transverse measurement. The mean values that make it possible to determine the trend of the average scattering height. They can also be obtained are brought into association with measured values from a scale for weighing the mat, or the finished board, via a computer in order to determine the the absolute value of the average weight per unit area.

If the value from the finished board scale and also the dimensions of the measured board are fed into a computer the average weight per unit area can be calculated from these values. This value can be associated with the mean value from the surface measurement so that one can obtain the absolute value of the average weight per unit area via the mean value of the surface measurement.

The technique of trend determination also leads in practice to an important advantage. If, for example, it is found that the weight determined via the scale for the finished boards remains constant, but that the mean value of the scattered height changes, then this is an indication that the scattered density has changed as a result of the chip composition. A growth of the mean value of the scattered height can accordingly provide an indication that the soft wood part of the chip composition has become larger. As a board which is manufactured entirely of soft wood requires a lower weight per unit area than a hard wood board for the same strength characteristics, a very good way exists of automatically reducing the desired input weight in the forming station by a specific amount thus realising a further material saving.

In accordance with an advantageous development of the invention, in addition to scanning the distance of the surface of the mat from a measuring plane, synchronous scanning of the distance of the respective mat carrier from a further measuring plane is effected and compensation for the faults originating from unevenness of the mat carrier is effected via the measured values that are obtained and which are associated with one another. In this manner the accuracy of measurement can be further increased and it is also ensured that the measured values are independent of wear effects which may eventually occur at the mat carriers.

For particle board manufacturing plants which operate with a very high output the forming station generally consists of several scattering heads, in particular a first scattering head for the lower covering layer, a second scattering head for the middle layer and a third scattering head for the upper covering layer. In accordance with an advantageous development of the invention a profile measurement is carried out by making a plurality of distance determinations in the transverse direction after each scattering head so that one can always control the contributions of the individual scattering heads to the scattered mat as accurately as possible. In this manner an eventual asymmetric board construction, which could lead to distortion effects in the finished board, can be avoided. An apparatus which is preferably used for carrying out the described method includes at least one measuring arrangement consisting of a transmitter and a receiver and also an associated processing unit, with the transmitter comprising a light source, in particular a laser, whereas the receiver is constructed as an optical system for determining the distance between the point of impingement of the light beam on the mat and the measuring plane specified by the position of the receiver. The measuring arrangement preferably operates with a comparatively high cycle frequency, in particular with a cycle frequency in the range of approximately 16 kHz.

Although in principle it is possible to operate with a stationary measuring arrangement, if necessary consisting of a plurality of units arranged alongside one another, it is preferable to use a unit movable on a cross beam in the transverse direction of the web.

In the event that scanning of the mat carrier is also to be carried out an additional measuring arrangement is provided beneath the mat carrier, with the two measuring arrangements, namely the measuring arrangements disposed above and below the mat, or mat carrier, being mutually directed towards one another and synchronously displaceable on respectively associated cross beams.

In addition, it is important for the invention that signals or measured values coming from a traversing radio isotope device for measuring weights per unit area can also be combined with the measured values obtained from the surface measuring plant of the invention, in place of the measuring signals obtained from a scale for measuring the mat or the finished board.

BRIEF DISCUSSION OF THE DRAWING

The invention will now be described in more detail in the following with reference to the drawing which shows:

FIG. 1 a schematic diagram for explaining the variations in weight per unit area, and FIG. 2 a schematic representation of an apparatus for carrying out the method of the invention.

DESCRIPTION OF THE PREFERRED EMBODIMENTS

Attention has already been drawn to the fact that on scattering a mat fluctuations in the weight per unit area occur in the longitudinal and transverse directions of the mat, with the fluctuations in the longitudinal direction mainly occurring over a longer period of time, and depending principally on the material and/or on the working steps before the forming station, whereas fluctuations of the surface density in the transverse direction are mainly of shorter duration and depend principally on the conditions in the forming station itself.

Figure 1:
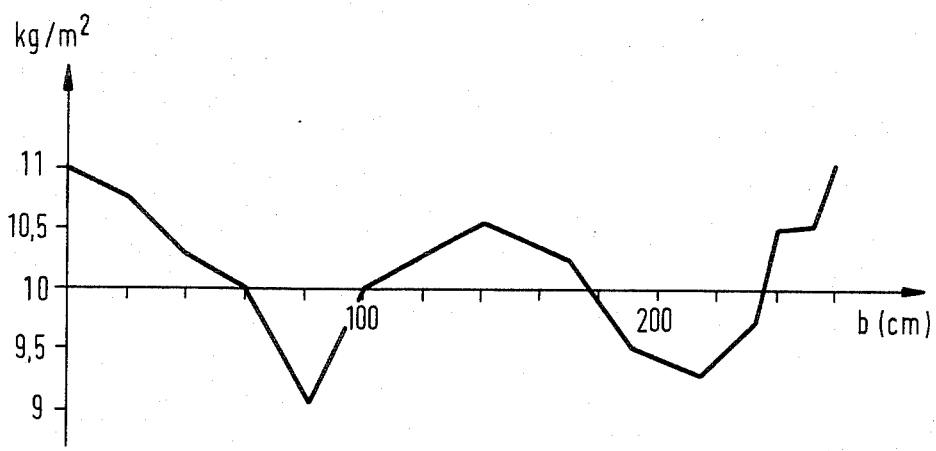

FIG. 1 shows a typical density per unit area distribution in the transverse direction of a board. It can be seen that the surface density (weight per unit area) which in the illustrated embodiment should be 10 kg/m$^2$ fluctuates between 9 kg/m$^2$ and 11 kg/m$^2$.

In order to be certain that the strength characteristics of a board, which are directly correlated with the fluctuations in weight per unit area, are reliably maintained it is necessary, when manufacturing a board having an intended surface density of 10 kg/m$^2$, to manufacture a board with a surface density of 11 kg/m$^2$ if surface density fluctuations on the scale of the fluctuations of FIG. 1 are present, because only then can it be ensured that the surface density values do not fall below 10 kg/m$^2$ at any point of the finished board. The fact that the safety reserve of approximately 10% which is necessary then leads to a quite considerable increase in the raw material costs is clear.

Figure 2:
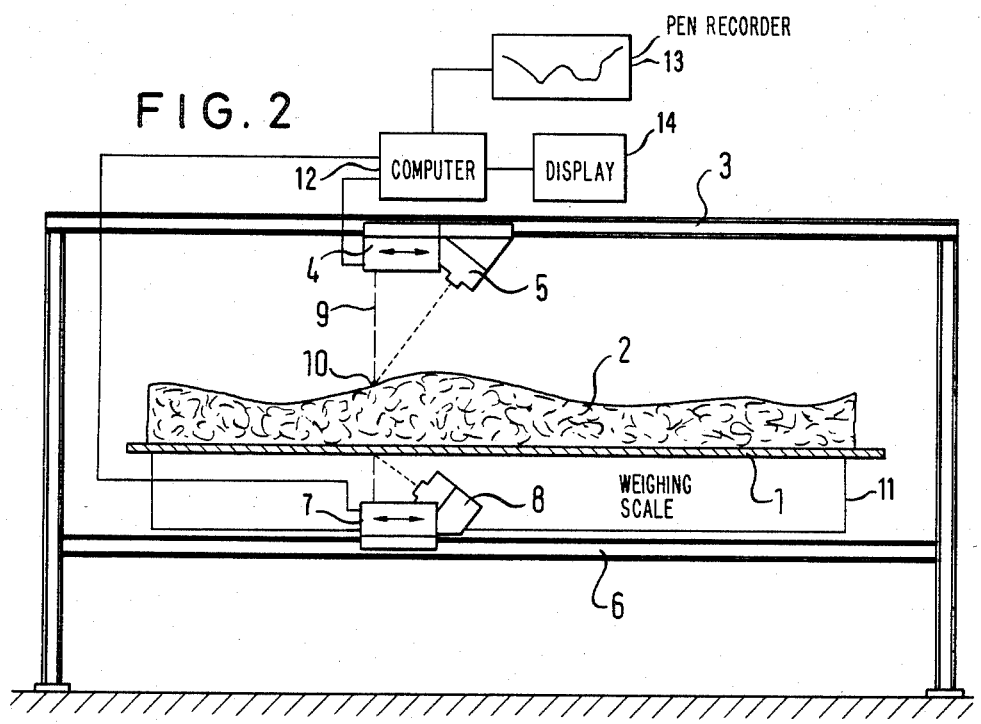

FIG. 2 shows a schematic illustration of the construction and manner of operation of an apparatus in accordance with the invention which makes it possible, via an optical contactless measurement, to directly and continuously detect the surface density distribution during board manufacture and thus to directly effect the required corrections in the machine setting and/or the material composition.

A mat 2 intended for pressing is arranged on a mat carrier 1, which can for example be a metal strip or a piece of sheet metal.

The surface of this mat 2 is shown uneven to an exaggerated scale in order to indicate the varying scattered height and weight/unit area in the transverse direction of the mat which can result from the most diverse influencing factors.

A measuring unit consisting of a transmitter 4 and a receiver 5 is provided which is displaceable along a cross beam 3 which extends transverse to the mat carrier 1 and at a defined distance therefrom. The transmitter 4 is preferably a laser which transmits a sharply bundled light beam 9 which impinges on the surface structure of the web 2 and there forms a very small scanning light bead 10. The receiver represents an optical system which is in the position of being able to accurately specify the range of the scanning light bead 10 from the measuring plane determined by the position of the receiver. This distance determination using the pulsed measuring unit 4, 5 can take place either by an optical measuring method or by a transit time measurement.

As the scanning light bead 10 is of the same order of magnitude as the smallest irregularities of the surface structure of the web 2 no disturbing measurement inaccuracies occur even in the side edge regions of the mat.

Beneath the mat 1 there is provided a further cross beam 6 whch carries a measuring arrangement, likewise consisting of a transmitter and receiver, which is displaceable synchronously with the measuring arrangement 4, 5 provided on the upper cross beam 3 and which serves to detect eventual unevenness or waves in the mat carrier 1 so that faults originating from the mat carrier and entering into the measurement result of the measuring arrangement 4, 5 can be removed again by subtraction.

In the case of a forming station with several scattering heads, measuring arrangements of the kind illustrated in FIG. 2 can be arranged after each scattering head and it should also be mentioned that the measured values that are obtained, and/or quantities derived can be directly displayed both on printers (pen recorder 13) and on display screen devices (14) so that the relevant operator can, if necessary, correct the manufacturing process without delay. It is also possible to directly influence the manufacturing plant in dependence on the measurement results that are obtained in the sense of a regulating circuit.

The weight of the mat as determined by a weighing scale 11 can be brought into association with the measured values from the measuring arrangements 4, 5 and 7,8 in a computer 12.

I claim:

1. A method of determining and correcting, during manufacture of particleboard, fluctuations in the weight per unit area of loose mat material scatttered by a scattering machine having at least one setting onto a mat carrier, said mat material having an upper surface and a composition comprising particulate material and at least one binder, the method comprising the steps of:
   (a) taking a plurality of individual distance measurements in the form of contactless measurements at various measurement positions across the mat material as the mat material moves on said mat carrier through a measurement station, by measuring the distance between a single predetermined measurement plane and the upper surface of the mat at each of said measurement positions, said contactless distance measurement being taken with a laser, said laser being focussed relative to the mat surface in such a way that the size of a scanning light bead of the laser lies at least within the range of the smallest occurring surface irregularities of the mat,
   (b) processing the individual measurements obtained as values representative of the weight per unit area of the mat at the respective measurement positions, and
   (c) controlling at least one setting of the scattering machine and the material composition in order to compensate for deviations from a desired value of the weight per unit area of the mat at the respective measurement positions.

2. A method in accordance with claim 1, comprising measuring the distance between the measurement plane and the scanning light bead with an optical system.

3. A method in accordance with claim 1, comprising determining the distance between the measurement plane and the scanning light bead by a transit time measurement.

4. A method in accordance with claim 1, wherein individual measurements are carried out one after the other and with a frequency in the kiloherz range.

5. A method in accordance with claim 4, wherein the kiloherz range is from 10 to 20 kHz.

6. A method in accordance with claim 1, wherein measured values originating from small roughnesses of the surface of chips contained in the mat are averaged out from said plurality of distance measurements.

7. A method in accordance with claim 1, wherein a mean value is formed from the individual measured values of each measurement across the mat material, and wherein mean values thus obtained are associated with measured values from a scale for weighing the mat via a computer to thereby determine the trend of the average scattering height, said trend indicating whether the average scattering height is tending to increase or decrease, the scattering heights determined from the distance measurements.

8. A method in accordance with claim 1, wherein a mean value is formed from the individual measured values of each measurement across the mat material, and wherein mean values thus obtained are associated with measured values from a scale for weighing the mat, via a computer to thereby determining the actual value of the average weight per unit area.

9. A method in accordance with claim 1, wherein a mean value is formed from the individual measured values of each measurement across the mat material, and wherein mean values thus obtained are associated with measured values from a scale for weighing the mat via a computer to thereby determine the trend of the average scattering height, said trend indicating whether the average scattering height is tending to increase or decrease, the scattering heights determined from the distance measurements and the actual value of the average weight per unit area.

10. A method in accordance with claim 1, wherein, in addition to measuring the distance of the surface of the mat from the measurement plane, a synchronous measuring of the distance of the respective mat from a further measuring plane is effected, and a compensation for the faults originating fron unevenness of the mat is effected via associated measured values that are obtained.

11. A method in accordance with claim 1, in stations with several sequential scattering heads, comprising taking a profile measurement across the mat material by taking a plurality of distance measurements.

12. A method in accordance with claim 1, comprising displaying the values on a pen recorder.

13. A method in accordance with claim 1, comprising displaying the values on a display screen.

* * * * *